Patented July 19, 1949

2,476,945

UNITED STATES PATENT OFFICE 2,476,945

SUBSTITUTED SULFANILYL-SULFANILAMIDES

Maurice L. Moore, Detroit, Mich., assignor to Sharp & Dohme, Incorporated, Philadelphia, Pa., a corporation of Maryland No Drawing. Application July 5, 1943,
Serial No. 493,579

10 Claims. (Cl. 260—239.6)

This invention relates to $N^4$-carboxyacyl-sulfanilylsulfanilamides, in which the carboxyacyl group is the radical remaining when the hydroxyl group is removed from only one of the two or more carboxyl groups of a heterocyclic polycarboxylic acid, and the invention covers such products containing the remaining carboxyl group or groups unaltered as well as with the hydrogen in any of such remaining carboxyl groups replaced by a carboxylate-forming element or radical.

The new products of this invention are in general therapeutically useful in varying degrees and applications, for example, in treating ailments of the intestinal tract.

The products of this invention may be represented by the general formula

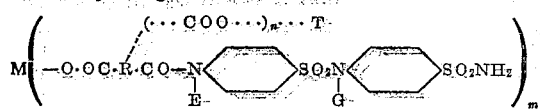

in which M is selected from hydrogen and monovalent and polyvalent radicals capable of combining with a carboxyl radical to form a carboxylate, such as the alkali metals sodium, potassium, lithium and the like, the alkaline earths as calcium, magnesium, barium and the like, antimony, copper, gold, iron, bismuth, and manganese and the like, an alkyl radical, a nitrogen base as ammonium and corresponding radicals of alkyl amines and alkanolamines and the like; and R is the residue of a heterocyclic polycarboxylic acid stripped of its carboxyl groups; and T is selected from hydrogen and the M-monovalent radicals and free valences of the M-polyvalent radicals not satisfied by the single carboxyl group shown directly linked to M; and $n$ is selected from zero and any whole number up to four, whereby the grouping

represents the carboxyl and the carboxylate groups over two from any polycarboxylic acid having more than two carboxyl groups, and $m$ is a small number selected from the class consisting of (A) one, in those compounds embraced herein in which all of the carboxyl groups in the carboxyacyl radical satisfy all of the valences of any polyvalent radicals represented by M and T; and (B) a small number equal to the valences of M, in those compounds embraced herein and selected from those (a) in which $n$ is zero, (b) in which each occurrence of the radical D is selected from hydrogen and any of the monovalent radicals represented by T, and (c) in which each occurrence of the radical T is different from the radical M; and E and G are each separately selected from hydrogen and alkyl, aralkyl and aryl radicals.

The expression "carboxylates" used in this specification and its appending claims embraces those groups resulting from replacing the hydrogen of a carboxyl group with any other grouping capable of combining with a carboxyl radical to form a carboxylate such as the various metals and the like, or an alkyl radical or a nitrogen base and the like of the type hereinabove illustrated at column 1, lines 22 through 31, preparation of which is illustrated at column 4, lines 25 through 49.

The carboxyacyl group (remaining group when the hydroxy group is removed from only one of the at least two carboxyl groups of a polycarboxylic acid) may be derived from any desirable heterocyclic polycarboxylic acid, for example, the pyridine polycarboxylic acids as the dicarboxypyridines such as quinolinic acid (2,3-dicarboxypyridine), lutidinic acid (2,4-dicarboxypyridine), 2,5-dicarboxypyridine, cinchomeronic acid (3,4-dicarboxypyridine), dipicolinic acid (2,6-dicarboxypyridine), and dinicotinic acid (3,5-dicarboxypyridine), also the diazine polycarboxylic acids as the dicarboxydiazines, for example, the dicarboxypyrazines, such as antipellagric acid (2,3-dicarboxypyrazine), 2,5-dicarboxypyrazine and 2,6-dicarboxypyrazine, as well as the derivatives thereof substituted on the nucleus, for example, those alkyl-substituted on the nucleus, as the homologs of antipellagric acid such as the nuclear-monoalkyl derivaties, as 2,3-dicarboxy-5-methyl-pyrazine, and the nuclear-dialkyl derivatives as 2,3-dicarboxy-5,6-dimethyl-pyrazine, as well as 2-carboxy-3-methyl-5-carboxy-6-methyl pyrazine, and also dicarboxypyridazines such as 4,5-dicarboxypyridazine as well as the derivatives thereof substituted on the nucleus, such as those alkyl substituted on the nucleus as 4,5-dicarboxy-3,6-dimethyl-pyridazine, and also the dicarboxypyrimidines such as 4,5-dicarboxypyrimidine and 4,6-dicarboxypyrimidine. Also included are the thiazole polycarboxylic acids such as the dicarboxythiazoles, as well as the derivaties thereof substituted on the nucleus, such as 2-methyl-4,5-dicarboxythiazole.

Thus, in this specification and the appending claims the expression "dicarboxydiazine" can only cover a member of the class of the dicarboxypyridazines, dicarboxy-pyrimidines, and dicarboxy-pyrazines, each of which contains no substitutents other than the two carboxyl groups on the diazine nucleus as well as these dicarboxy-diazines further substituted on said diazine nucleus by one or two alkyl substituents as described above. Likewise, the expression "dicarboxy-thiazole" embraces only the thiazole nucleus containing no substituents other than the two carboxyl groups and such dicarboxy-thiazole group further substituted on the thiazole nucleus by an alkyl radical as indicated above.

The invention also includes the preparation of these $N^4$ - carboxyacyl - sulfanilylsulfanilamides which are made by heating the desired polycarboxylic acid, its anhydride or acid chloride such as the di-acid chloride thereof, with sulfanilylsulfanilamide, either merely together or in an inert reaction medium such as an inert solvent, and as in the latter case and with the acid chloride separating the desired end product.

The invention may be illustrated by, but not restricted to, the following:

Example.—$N^4$-antipellagroyl-sulfanilylsulfanilamide.—4.3 grams of 2,3-dicarboxypyrazine anhydride is added in portions to a boiling suspension of 9.4 grams of sulfanilylsulfanilamide in 75 cc. of alcohol. After the addition is completed, the mixture is boiled for five minutes to assure complete precipitation of the product and is then allowed to cool. The cooled mixture is then filtered and the residue on the filtrate taken up with aqueous sodium bicarbonate solution dissolving the desired product and leaving an insoluble residue which is removed by filtration. The filtrate is then made just slightly acid with hydrochloric acid and the desired product precipitated, filtered off and purified, for example, by reprecipitation, is

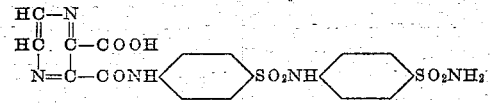

By separately replacing the 2,3-dicarboxypyrazine anhydride of this example by the corresponding stoichiometric equivalent of respectively the anhydride of 2,3-dicarboxy-5,6-dimethyl-pyrazine and of 2,3-dicarboxy-5-methyl-pyrazine, there results the corresponding: $N^4$-(3-carboxy-5,6-dimethyl-pyrazinoyl)-sulfanilylsulfanilamide and $N^4$ - (3 - carboxy - 5 - methyl - pyrazinoyl) - sulfanilylsulfanilamide. By separately replacing the anhydride used in the original example by the corresponding stoichiometric equivalent of respectively quinolinic acid anhydride, cinchomeronic acid anhydride, and of 2-methyl-4,5-dicarboxythiazole anhydride and following substantially the same procedure as in the example, there results the corresponding $N^4$-quinolinoyl-sulfanilylsulfanilamide, $N^4$ - cinchomeronoyl - sulfanilylsulfanilamide and $N^4$-(2-methyl-5-carboxythiazole-4-carboxylyl)-sulfanilylsulfanilamide.

By heating sulfanilylsulfanilamide with approximately a 15% excess over an equimolecular portion of respectively lutidinic acid, dinicotinic acid, and dipicolinic acid, in intimate mixture to a fusion temperature around between 160–190° C. in a sand bath for about between an hour and an hour and a half with occasional manual stirring, then cooling the melt and taking it up in dilute alkali, around 5%, and precipitating with a slight excess of hydrogen chloride, and then filtering off the precipitate and treating it with cool sodium bicarbonate solution and filtering off the soluble residue, and then making this filtrate slightly acid with hydrogen chloride, there result the following corresponding products, which may be further purified by recrystallization with methyl "Cellosolve" and water: $N^4$-lutidinoyl-$N^1$-4-sulfamylphenylsulfanilamide, $N^4$-dinicotinoyl-$N^1$-4-sulfamylphenylsulfanilamide and $N^4$-dipicolinoyl-$N^1$-4-sulfamylphenylsulfanilamide.

By adding an equimolecular stoichiometric equivalent of sulfanilylsulfanilamide in small portions over a forty minute period to a solution of a given amount of the di-acid chloride of 4,6-dicarboxypyrimidine in a suitable quantity of a solvent such as dioxan (for example, .006 mol of each reactant in about 50 cc. of solvent) and permitting the mixture to stand at room temperature for about at least ten minutes after the addition is completed, and then pouring the mixture into a suitable quantity (approximately 100 cc.) of dilute sodium bicarbonate solution, filtering off the insoluble portion after the effervescence discontinues, then clarifying the filtrate with charcoal and after the removal of the latter making the filtrate acid with hydrogen chloride and chilling it, there results $N^4$-(6-carboxy-pyrimidine-4-carboxylyl)-$N^1$-4-sulfamylphenylsulfanilamide.

The carboxylate form of any of the compounds of the invention may be prepared, for example, by adding to a small amount of water an excess of the compound over its solubility in water and dissolving the excess by stirring in a sufficient quantity of, for example, anhydrous sodium carbonate. The solution is preferably filtered and from the filtrate the highly soluble sodium salt can be isolated, for example, by adding an equal volume of alcohol and pouring the resulting solution into about 10 volumes of acetone. The substance thrown out of solution is permitted to settle and the supernatant liquid withdrawn and the residue preferably treated several times with fresh acetone. After decanting the acetone from the last treatment, the resulting desired sodium salt may be dried preferably under vacuum.

Other metal carboxylate salts of the compounds such as the copper, gold, iron and bismuth salts and the like may be obtained by reacting the alkali metal salts, preferably in aqueous solution, with a suitable soluble salt of the metal, the carboxylate salt of which is desired. The desired carboxylate salt is obtained by resulting double decomposition.

The compounds of the invention, applicable in treating ailments of the intestinal tract, exhibit such activity by the introduction to the various nuclear portions of the individual compound, of substituents, the introduction of which into the basic nucleus leaves the compound substantially non-toxic so that it would cause no permanent injury to the subject when administered in the necessary therapeutic dosage. The metallic element in the compounds used as in preparations for treating intestinal ailments are such that their inclusion in the compound introduces similarly no unduly toxic characteristics. Thus, for example, as with $N^4$-quinolinoyl-sulfanilylsulfanilamide, it is possible to build up a high concentration in the intestinal tract without a simultaneously high blood level.

The various compounds, used in the treatment of intestinal ailments are administered orally, either in the form of tablets, capsules or powders of the solid material, or as solutions of any suitable concentration thereof.

While the compounds constituting the invention have been described by reference to certain specific embodiments thereof, other modifications, extensions or substitutions may be made

What is claimed is:

1. N⁴ - carboxyacylsulfanilylsulfanilamides of the general formula

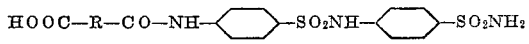

in which R is a divalent heterocyclic radical with its carboxyl group and the carbonyl group shown in the general formula linked respectively to separate nuclear carbon atoms of a mononuclear heterocycle which is a member of the class consisting of (a) diazine, (b) thiazole, (c) pyridine, and (d) each of the heterocycles (a) and (b) alkyl-substituted elsewhere than at the heteroatom and the carbon atoms to which the carbonyl and the carboxyl groups are linked.

2. N⁴ - carboxyacylsulfanilylsulfanilamides, as claimed in claim 1, wherein the only substituents on the heterocyclic radical are the carboxyl group and the carbonyl group shown in the general formula linked respectively to separate nuclear carbon atoms.

3. N⁴ - carboxyacylsulfanilylsulfanilamides, as claimed in claim 1, wherein the heterocyclic radical R is alkyl-substituted.

4. N⁴ - carboxyacylsulfanilylsulfanilamides, as claimed in claim 1, wherein the heterocyclic radical is a diazine radical.

5. N⁴ - carboxyacylsulfanilylsulfanilamides, as claimed in claim 1, wherein the heterocyclic radical is the diazine radical.

6. N⁴ - carboxyacylsulfanilylsulfanilamides, as claimed in claim 1, wherein the heterocyclic radical is an alkyl-substituted diazine radical.

7. N⁴ - carboxyacylsulfanilylsulfanilamides, as claimed in claim 1, wherein the heterocyclic radical is a diazine radical alkyl-substituted on one of its nuclear carbon atoms.

8. N⁴ - carboxyacylsulfanilylsulfanilamides, as claimed in claim 1, wherein the heterocyclic radical is a thiazole radical.

9. N⁴ - carboxyacylsulfanilylsulfanilamides, as claimed in claim 1, wherein the heterocyclic radical is the thiazole radical.

10. N⁴-carboxyacylsulfanilylsulfanilamides, as claimed in claim 1, wherein the heterocyclic radical is the thiazole radical mono-alkylated at one of its nuclear carbon atoms.

MAURICE L. MOORE.

REFERENCES CITED

The following references are of record in the file of this patent:

UNITED STATES PATENTS

| Number | Name | Date |
|---|---|---|
| 2,323,651 | Dohrn | July 6, 1943 |
| 2,324,013 | Moore | July 13, 1943 |

FOREIGN PATENTS

| Number | Country | Date |
|---|---|---|
| 502,558 | Great Britain | Mar. 15, 1939 |
| 843,415 | France | Mar. 27, 1939 |

OTHER REFERENCES

Journal Amer. Chem. Soc., March 1939, pp. 613–616.

Prac. Soc. Exper. Biol. and Med., Oct. 1941, page 129.

Chemical Reviews, Aug. 1940, pp. 121–125.

Journal Amer. Chem. Soc., July 1942, pp. 1572–1575.